July 5, 1960  L. J. RAMSE  2,943,833
HOSE HOLDER
Filed June 1, 1959
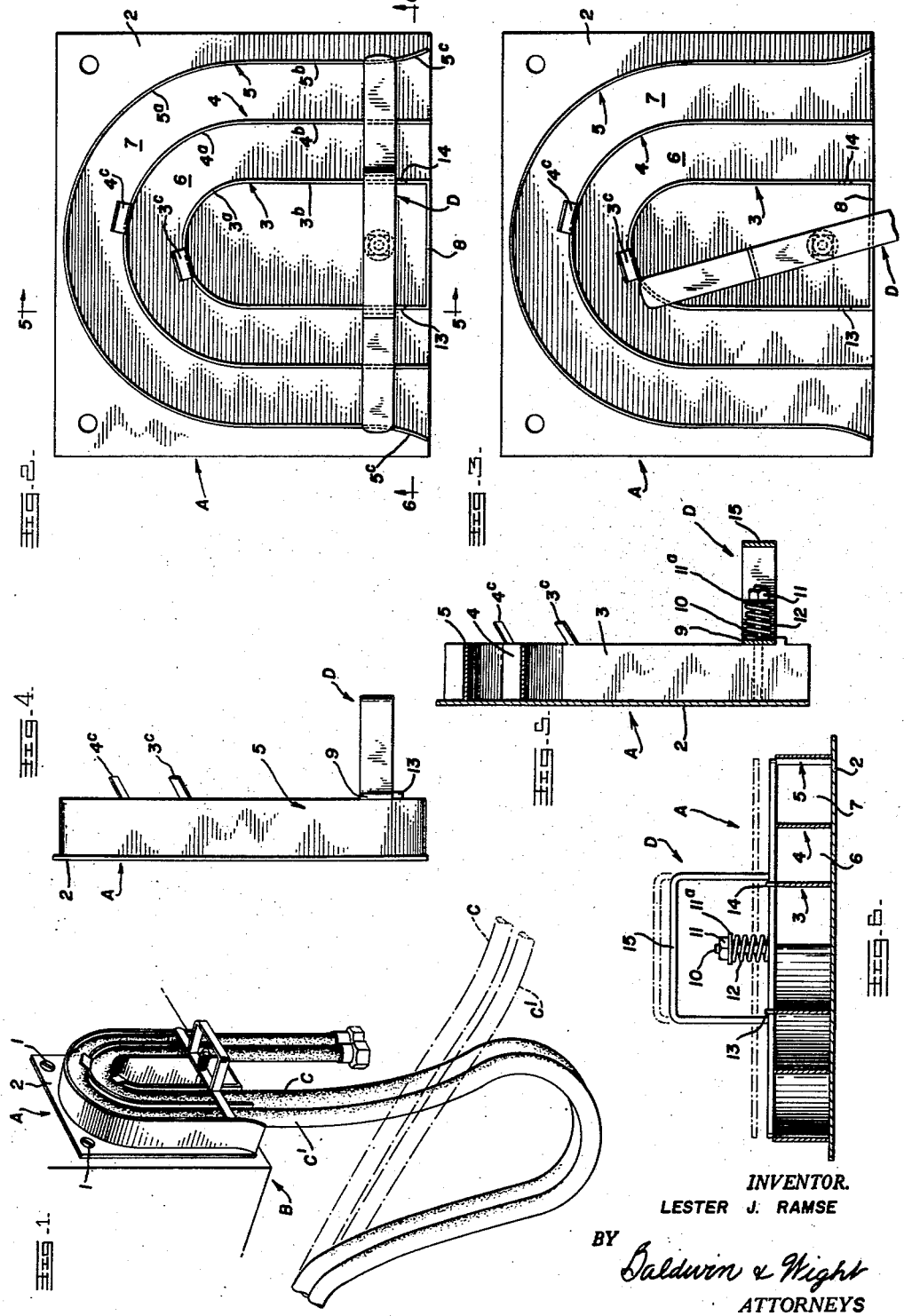
INVENTOR.
LESTER J. RAMSE
BY
*Baldwin & Wight*
ATTORNEYS

United States Patent Office 2,943,833
Patented July 5, 1960

2,943,833

HOSE HOLDER

Lester J. Ramse, Rural Route, Bricelyn, Minn.

Filed June 1, 1959, Ser. No. 817,135

8 Claims. (Cl. 248—89)

This invention relates to hose holders, and more particularly to hose holders for supporting a hose or hoses on one of two articulated vehicles or equipments in a manner to avoid fouling, tangling or undue twisting of the hose or hoses during relative turning or other movements of the vehicles or equipments.

An object of the invention is to provide a hose holder of this class which is capable of holding hoses in selected positions with provision for easy and quick hose retention or releasing adjustment.

Another object of the invention is to provide a construction of the character stated, including a new and improved arrangement of hose receiving grooves and releasable retaining means.

A further object of the invention is to provide a hose holder of the kind referred to which is of simple and economical construction and is substantially universally adapted for use in connection with vehicle trains or other combined equipments requiring a pressure hose extending from one vehicle or equipment unit to the other.

Other objects of the invention will become apparent from a reading of the following description, the appended claims, and the accompanying drawings, in which:

Figure 1 is a perspective view showing a hose holder embodying the invention mounted on a support with two hoses being shown in the positions occupied when, for example, an agricultural tractor or the like, of which the support is a part, is disconnected from the implement normally serviced by the hoses;

Figure 2 is a front elevational view of the hose holder shown in Figure 1, a hose retaining member or device being shown in retaining position;

Figure 3 is a view similar to Figure 1 but showing the hose retaining member in releasing position;

Figure 4 is a side elevation of the hose holder as viewed from the left of Figure 2;

Figure 5 is a vertical section on the line 5—5 of Figure 2; and

Figure 6 is a horizontal section on the line 6—6 of Figure 2.

A hose holder embodying the invention in a preferred form and generally designated A is shown in Figure 1 as being secured by screws 1 on a support B which way, for example, be a part of the frame of an agricultural tractor, tractor for hauling trailers, or the like. Two hoses C and C¹ are shown fragmentarily as extending from the pressure-generating unit (not shown) on the tractor for servicing either hydraulic or pneumatic fluid pressure operated equipment on a towed implement or vehicle. The hose holder A is constructed in a manner particularly described below so as to be capable of having the hoses C and C¹ conveniently positioned in and held by the holder, either with the hoses in stored or inoperative position as shown in full lines in Figure 1, or in operative positions in which the slack loops shown in Figure 1 are pulled up and the ends of the hoses extended rearwardly for connection to the equipment on the towed vehicle or the like. When in operative positions, the hoses are suspended from above and are thus located to avoid being fouled or twisted during turning and other relative movements of the articulated towing and towed vehicles. The construction of the hose holder is such that the hoses may easily be released from the holder and extended as indicated in dot-dash lines in Figure 1 for servicing or inspection of the auxiliary pressure delivery equipment.

Generally considered, the hose holder shown for the purposes of illustration includes a base 2 which might be of flat sheet metal, and inner, central and outer wall members generally designated 3, 4, and 5 which also may be of sheet metal and which may be connected to the base 2 in a suitable manner as by welding or soldering. The wall members are formed respectively to include arcuate portions $3^a$, $4^a$ and $5^a$ which extend outwardly from the base 2 and are spaced symmetrically and concentrically so as to provide inner and outer open face hose receiving grooves 6 and 7 closed at their roots by the base 2. In the preferred construction the walls 3, 4, and 5 are formed to be of inverted U shape with the U-shaped walls being in one-within-the-other relation, the U arcs $3^a$, $4^a$, and $5^a$ being at the top of the hose holder and the U legs $3^b$, $4^b$, and $5^b$ extending downwardly, the grooves 6 and 7 being of correspondingly inverted U shape. A cross wall 8 extends between the lower ends of the U legs $3^b$ for bracing the construction. Preferably, the lower ends of the U legs $5^b$ are flared outwardly as at $5^c$.

In use, the hoses C and C¹ may be positioned in the open face grooves 6 and 7 as shown in Figure 1 with any desired portions of the free ends of the hoses extended rearwardly for connection to the trailing equipment. For preventing accidental displacement of the hoses from the holder grooves 6 and 7, a retaining member or device D, comprising a cross arm 9, is mounted for pivotal or rocking and also sliding movements normal to the base by means of a pintle 10 secured to the base with its axis normal to the base and between parts of the inner wall portion $3^a$ at the extremities of the arc. The pintle 10 is threaded at its outer end to receive a nut 11 which through a washer $11^a$ compresses a spring 12 to cause the latter to urge the cross arm 9 against the outer or free edges of the wall portions 3, 4, and 5. When so held against the wall portions, the cross arm 9 is prevented from being turned or rocked away from its Figure 2 or hose retaining position by engagement with stop lugs 13 and 14 projecting outwardly from the opposed U legs $3^b$ of the inner wall 3. When the retaining device is maintained in its retaining position shown in Figure 2 it extends across the grooves 6 and 7 so as to prevent accidental displacement of the hoses.

The hoses may be released from the grooves by pulling the crossbar 9 outwardly as may be readily accomplished with the aid of a handle 15 forming part of the hose retainer D. When the retainer D is pulled outwardly against the urge of the spring 12, the crossbar 9, will be moved beyond and disengaged from the stop lugs 13 and 14 so as to permit the retaining device D to be turned or rocked to the position shown in Figure 3 in which the crossbar 9 is substantially clear of the open face grooves 6 and 7. With the crossbar 9 in its Figure 3 or released position, the hoses may readily be lifted out of the grooves 6 and 7.

Placement of the hoses into the grooves 6 and 7, with the crossbar 9 in its released position, may be facilitated by guide tabs $3^c$ and $4^c$ extending outwardly, respectively, from the outer edges of the wall portions $3^a$ and $4^a$ at such an inclination as respectively to project over the grooves 6 and 7. The projection of the tabs over the associated grooves should be substantially less than the width of the grooves so as not substantially to reduce the space for inserting the hoses into the grooves.

In use, when, for example, inserting the hose C into the groove 6, the hose may be laid, so to speak, on the tab $3^c$ outwardly beyond the wall 3 and then moved into the groove 6. The hose $C_1$ may similarly be introduced into the groove 7 with the aid of the guide tab $4^c$. Preferably, the guide tabs $3^c$ and $4^c$ are arcuately offset from one another, the tab $3^c$ being on one side of the common vertical center line of the walls 3, 4 and 5 and the tab $4^c$ being on the opposite side of the common center line. This offsetting of the tabs prevents the tab $4^c$ from interfering substantially with the introduction of the hose into the groove 6.

The construction shown is especially adapted for holding two companion hoses but it is apparent that the illustrated construction may serve as well for holding a single hose when such is all that is required, according to the associated towing and towed equipment. It will also be apparent that for use in installations known in advance to require holding of only one hose, the hose holder may be modified to the extent of omitting one of the walls 3, 4, or 5, say, the wall 5, so as to provide a single hose holding groove.

The construction shown embodies the invention in a preferred form but it is intended that the disclosure be illustrative rather than definitive, the invention being defined in the appended claims.

I claim:

1. In a hose holder, a base attachable to a support; inner and outer arcuate wall portions on and extending outwardly away from said base in spaced concentric relation and providing between said wall portions an open face hose receiving groove closed at its root by said base; and a member mounted for movements relative to said wall portions to a retaining position in which said member extends across said groove for retaining a hose received therein against displacement therefrom and to a releasing position in which said member is substantially clear of the open face of said groove to enable insertion of a hose into or removal of a hose from said groove.

2. In a hose holder, a base attachable to a support; inner and outer arcuate wall portions on and extending outwardly away from said base in spaced concentric relation and providing between said wall portions an open face hose receiving groove closed at its root by said base; and a tab extending outwardly from the outer edge of said inner wall portion and being inclined to project over substantially less than one half width of said groove, said tab being adapted initially to be engaged by a hose and then, because of the inclination of said tab, to guide the hose into said groove.

3. In a hose holder, a base attachable to a support; inner and outer arcuate wall portions on and extending outwardly away from said base in spaced concentric relation and providing between said wall portions an open face hose receiving groove closed at its root by said base; a tab extending outwardly from the outer edge of said inner wall portion and being inclined to project over substantially less than one half width of said groove, said tab being adapted initially to be engaged by a hose and then, because of the inclination of said tab, to guide the hose into said groove; and a member mounted for movements relative to said wall portions to a retaining position in which said member extends across said groove for retaining a hose received therein against displacement therefrom and to a releasing position in which said member is substantially clear of the open face of said groove to enable insertion of a hose into or removal of a hose from said groove.

4. In a hose holder, a base attachable to a support; inner and outer arcuate wall portions on and extending outwardly away from said base in spaced concentric relation and providing between said wall portions an open face hose receiving groove closed at its root by said base; a hose retaining member; and means on said base pivotally mounting said member to rock about an axis normal to said base and between parts of said inner wall portion at opposite extremities of the arc thereof, whereby said member may be rocked to a retaining position in which said member extends across said groove for retaining a hose received therein against displacement therefrom and to a releasing position in which said member is substantially clear of the open face of the groove for enabling insertion of a hose into or removal of a hose from said groove.

5. In a hose holder, a base attachable to a support; inner and outer arcuate wall portion son and extending outwardly away from said base in spaced concentric relation and providing between said wall portions an open face hose receiving groove closed at its root by said base; a pintle on and normal to said base between parts of said inner wall portion at opposite extremities of the arc thereof; a hose retaining member mounted on said pintle for sliding movements normal to said base towards and away from said wall portions and also for rocking movements to a retaining position in which said member extends across said groove for retaining a hose received therein against displacement therefrom and to a releasing position in which said member is substantially clear of the open face of the groove for enabling insertion of a hose into or removal of a hose from said groove; a spring yieldably urging said member axially of said pintle toward said wall portions; and stop means fixed with respect to said wall portions for engaging said member when it is in retaining position and holding it against rocking about said pintle, said member being disengageable from said stop means by outward sliding of said member on said pintle against the urge of said spring.

6. In a hose holder, a base attachable to a support; inner and outer arcuate wall portions on and extending outwardly away from said base in spaced concentric relation and providing between said wall portions an open face hose receiving groove closed at its root by said base; a pintle on and normal to said base between parts of said inner wall portion at opposite extremities of the arc thereof; a hose retaining member mounted on said pintle for sliding movements normal to said base towards and away from said wall portions and also for rocking movements to a retaining position in which said member extends across said groove for retaining a hose received therein against displacement therefrom and to a releasing position in which said member is substantially clear of the open face of the groove for enabling insertion of a hose into or removal of a hose from said groove; a spring yieldably urging said member axially of said pintle into contact with the outer edges of said wall portions; and a pair of stop lugs on and extending outwardly from parts of one of said wall portions at opposite extremities of the arc thereof and being engageable with said member when the latter is held in contact with said wall portions by said spring and is in said retaining position, engagement of said stop lugs with said member preventing said member from being rocked to releasing position, and said member being disengageable from said stop lugs by outward sliding of said member on said pintle against the urge of said spring whereby to enable said member to be rocked to releasing position.

7. In a hose holder, a base attachable to a support; two generally U-shaped wall portions on and extending outwardly from said base, one within the other and being of different extents both transversely and longitudinally of the U so as to provide between said portions an open face hose receiving groove closed at its root by said base; and a member mounted for movements relative to said wall portions to a position in which said member extends across said groove for retaining a hose received therein against displacement therefrom and to a releasing position in which said member is substantially clear of the open face of said said groove to enable insertion of a hose into or removal of a hose from said groove.

8. In a hose holder, a base attachable in an upright position to a support; inner, central and outer U-shaped wall portions on and extending outwardly from said base in one-within-the-other relation with the legs of the U's extending downwardly and the arcs of the U's at the top, said wall portions defining an inner open face U-shaped groove between said inner and central wall portions and an outer open face U-shaped groove between said central and outer wall portions; a first tab extending outwardly from the outer edge of said inner wall portion within the arc thereof on one side of the common vertical center line of said wall portions and being inclined to project partially over said inner groove so as initially to be engaged by a hose for guiding the latter into said inner groove; and a second tab extending outwardly from the outer edge of said center wall portion within the arc thereof on the other side of said common vertical center line and being inclined to project partially over said outer groove so as initially to be engaged by a hose for guiding the latter into said outer groove.

References Cited in the file of this patent

UNITED STATES PATENTS

| 169,344 | Edwards | Nov. 2, 1875 |
| 291,771 | Rasgorshek | Jan. 8, 1884 |
| 1,445,475 | Berlow | Feb. 13, 1923 |

FOREIGN PATENTS

| 542,312 | Canada | June 18, 1957 |